March 25, 1952     G. L. MEYERS ET AL     2,590,264
SLEEVE TYPE FASTENING DEVICE FOR RESILIENT
PLASTIC ARTICLES AND THE LIKE
Filed Aug. 24, 1946
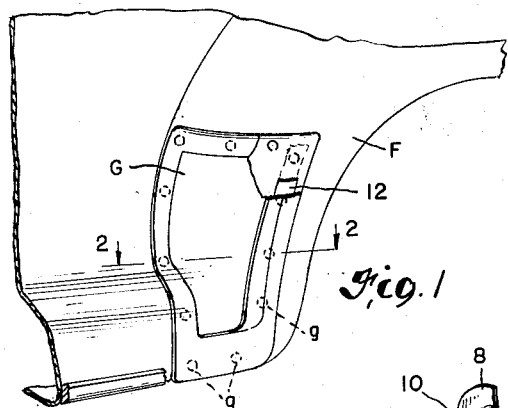
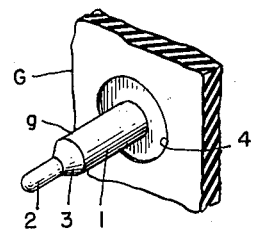
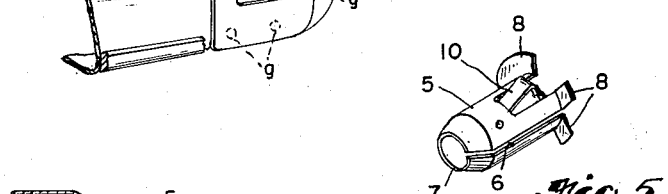
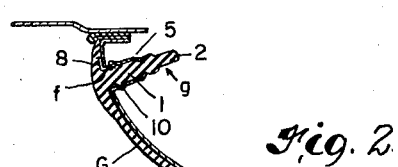
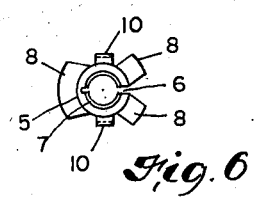
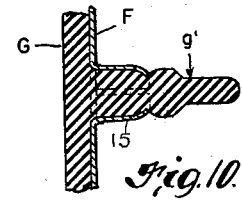
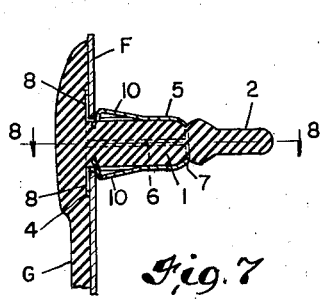
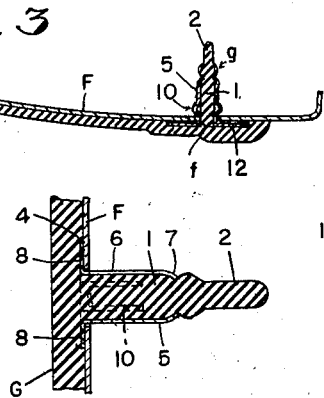
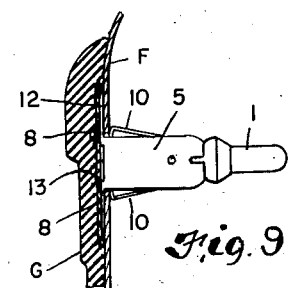
INVENTORS
GEORGE L. MEYERS and
BY    JOHN C. SHUTT
Oberlin & Limbach
ATTORNEYS.

Patented Mar. 25, 1952

2,590,264

UNITED STATES PATENT OFFICE 2,590,264

SLEEVE TYPE FASTENING DEVICE FOR RESILIENT PLASTIC ARTICLES AND THE LIKE

George L. Meyers, Willoughby, and John C. Shutt, Wickliffe, Ohio, assignors, by mesne assignments, to The Ohio Rubber Company, Willoughby, Ohio, a corporation of Delaware Application August 24, 1946, Serial No. 692,780

10 Claims. (Cl. 24—213)

The present improvements, relating as indicated to fastening devices, have more particular regard to fastening means for securing a rubber pad, buffer, or like rubber member to an apertured metal sheet or equivalent support.

One particular installation to which such improved fastening device is particularly adapted is the attachment of rubber protecting pads or guards to automobile fenders. However, it will be understood that the use of the invention is not limited to any such specific field; in other words, the fastening device is equally well suited for attaching rubber sealing strips to door openings and for other uses which it is unnecessary to list.

One principal object of the invention is to provide fastening means of the type in question which will avoid the necessity of operating thereon from the rear of the support, i. e. in the case of such fender guard to permit attachment of the same directly to the outer surface of the fender. A further object is to provide such a fastening device which will be simple and inexpensive to manufacture and which may be readily adaptable to the various fields of use indicated above.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a broken perspective view of an automobile fender showing a rubber pad or guard attached thereto by means of our present improved fastening device;

Fig. 2 is a transverse section through such fender and attached guard, the plane of the section being indicated by the line 2—2 Fig. 1;

Fig. 3 is a similar sectional view showing a modification in construction;

Fig. 4 is a perspective view on a somewhat larger scale of one element of the fastening device;

Fig. 5 is a similar perspective view of a complementary element;

Fig. 6 is an end view of the latter;

Fig. 7 is a sectional view of the assembled elements as they appear when applied;

Fig. 8 is a similar sectional view taken at right angles to that of Fig. 7, as indicated by section line 8—8 thereon;

Fig. 9 is a sectional view similar to that of Fig. 7 but showing the modification in construction that is also shown in Fig. 3; and Fig. 10 is another sectional view similar to that of Fig. 7 but showing a further modification in construction.

As indicated, for the purpose of illustration our improved fastening device is shown as utilized for the purpose of attaching a rubber cover or guard G to an automobile fender F. It will be understood, however, that such rubber member may assume any desired pad-like or other form, and that similarly said fender represents any form of support to which such pad or cover is to be attached.

In order to permit such attachment the supporting member is formed with one or more apertures $f$, the number and disposition of which will depend upon the character and extent of the cover or pad G. Whereas in the case of a fender guard the latter is designed to cover a substantial area, a number of such apertures will desirably be provided, being disposed in spaced relation along lines adjacent the respective margins of the pad.

The latter, whatever its form or extent will be provided with a corresponding number of integral studs $g$, preferably of the same material as that of which the pad is formed, i. e. of rubber or rubber-like material, so that such studs will be both flexible as well as longitudinally stretchable for the purpose hereinafter described. A preferred form of the stud thus provided is best illustrated in Fig. 4, from which it will be seen to comprise a main cylindrical body 1 that terminates in an extension 2 of reduced diameter, joined to such body portion by a tapered section 3. There may also be provided in the body of the pad G adjacent the base of the stud a shallow recess 4 to receive one end of the complementary fastening device where the latter is an entirely separate part, as shown in all of the figures except Fig. 10.

This complementary fastening member, in the preferred form best illustrated in Figs. 5 and 6, comprises a sleeve 5 of general cylindrical form having an interior diameter substantially equal to the exterior of the diameter of the body 1 of the stud. Such sleeve is desirably formed with a slit 6 that extends longitudinally of one side thereof and has an inturned flange 7 at its outer end which correspondingly constricts the diameter of such end. At its other end the sleeve is formed with one or more outwardly radially directed flanges 8 that when the device is assembled are designed to be received in the depression 4 formed in the pad G at the base of stud $g$.

Also adjacent its lower end said sleeve is formed with one or more (two as illustrated) angularly rebent inwardly directed prongs 10. The free ends of the latter are normally disposed to lie substantially flush with the interior surface of the sleeve but incidentally to the assembly of the device, as will now be described, such ends are forced inwardly so as to firmly engage or grip the adjacent portions of the corresponding stud $g$.

In utilizing the fastening device thus described, the sleeve 5 is assembled on the stud $g$ by inserting the reduced outer end of the latter through the constricted outer end of the sleeve, whereupon by gripping such outer end and applying longitudinal tension to the stud, the normal diameter of the latter will be sufficiently reduced to permit the sleeve to pass thereover until the flanges 8 at the inner end thereof are seated against the pad G at the base of the stud. This operation is further facilitated by the fact that the sleeve, which will ordinarily be stamped up from light gauge sheet metal, is longitudinally slit and so capable of a certain amount of expansion. After the sleeve has been thus seated, longitudinal tension on the stud is released and the body of the latter, expanding to normal diameter will be firmly engaged or gripped by the flange 7. Flange 7, in fact, indents the resiliently deformable stud or protuberance as shown and is interengaged with the latter so that such fastening device or retaining member will not thereafter be withdrawn in normal use. Also, depending upon the disposition of the inner ends of the prongs 10, the latter may likewise have a certain amount of gripping action; this however is measurably increased when the pad with the fastening device thus assembled thereon is attached to its support by the further assembly step now to be described.

In order to complete the attachment of the pad G to the support F, the former is simply placed over the latter with the assembled fastening device or devices aligned with the corresponding hole or holes $f$, the diameter of which it should be explained is such as to permit ready passage therethrough of the sleeve 5. However, the angularly rebent prongs 10 will be engaged by the sides of the aperture and in order to bring the inner face of the pad into contact with the support pressure is applied to the former opposite the stud sufficient to force said prongs 10 inwardly until they pass through the aperture $f$. Thereupon the prongs will spring outwardly behind the sheet or equivalent support and firmly lock the same and pad together. By reason of the angular conformation of the prongs the latter will be engaged by the wall of the corresponding aperture and held in firm engagement with the adjacent portion of stud $g$, thus supplementing the corresponding action of the constricted outer end of the sleeve.

In some cases it may be found desirable to reenforce the pad G by imbedding therein or vulcanizing thereto a light metal strip or piece of metal netting. Such a strip 12 is shown thus imbedded along one side of pad G in Figs. 1, 3 and 9, being aligned with the corresponding stud $g$ on the pad. In such case, as best shown in Fig. 9, the strip will be formed with holes 13 respectively adjacent such studs so that the base of the latter will in effect be continuous with the entire transverse thickness of the pad.

In the further modified construction illustrated in Fig. 10, a stud $g'$ integral with the rubber pad and otherwise of substantially the same construction as previously described, is employed as one member of the fastening device. However, instead of employing an entirely separate sleeve 5, a corresponding sleeve 15 is stamped up integrally from the sheet support, or otherwise fixedly united to the latter at points corresponding with the apertures $f$ utilized in the previously described constructions. Said sleeve 15, as before, will desirably be formed with a longitudinal slit and has an inturned flange at its outer end whereby such end is constricted and thus adapted to grip the stud $g'$ when the latter is drawn therethrough. However, in this form, no rebent prongs of course are necessary to hold the sheet support in place against the pad and these may accordingly be omitted. In applying this form of our fastening device, it is of course necessary to engage and pull the stud through the sleeve incidentally to the bringing together of the rubber pad and support.

In describing certain parts of the device as made of rubber, it will be understood that this term is intended to connote not only the product resulting from the vulcanization of natural rubber, but also neoprene and other synthetic rubbers or rubber substitutes which are now available.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention.

1. A fastening device comprising a stud of material resiliently deformable upon stretching, and a tubular sleeve adapted to fit over said stud when the latter is longitudinally stretched and its cross-sectional area thereby reduced, said sleeve having an inturned annular flange at one end adapted to grip and constrict said stud when in normal, unstretched, state and being additionally formed with a rebent, inwardly directed prong adjacent its other end adapted to engage the surface of a supporting member with said stud protruding therethrough.

2. A fastening device for securing an article to an apertured support comprising in combination a protuberance of resiliently distortable material extending from such article and adapted to pass through such aperture, and a metal clip mounted on said protuberance against withdrawal axially thereof, a portion of said clip being deformed to present a normally inclined surface projecting laterally outwardly thereof but supported by said underlying resiliently distortable protuberance, said portion being spaced from the body of such article whereby, when said protuberance and clip mounted thereon are inserted in such aperture, said projecting portion will be forced in against the yielding action of said resilient material by engagement with the lip of such aperture and will then be again forced out into locking position by said resilient material when said projecting portion has passed through such aperture.

3. A fastening device for securing an article to an apertured support comprising in combination a protuberance of resiliently distortable material extending from such article, a tubular metal sleeve adapted to be fitted over such protuberance when the latter is in longitudinally stretched and therefore transversely contracted condition and to grip such protuberance when the latter is returned to normal unstretched condition, such protuberance and sleeve thereon being adapted to be inserted in such aperture, and a normally laterally outwardly projecting portion on said sleeve engaging the side of said protuberance adapted to be forced inwardly against resilient yielding action of said protuberance when such protuberance and sleeve assembly are inserted in such aperture and to spring out into locking position under the effect of such resilient action when it has passed through such aperture.

4. A device for fastening a flexible rubber member to an apertured supporting sheet comprising an integral resiliently extensible stud on the sheet-contacting face of said member adapted to project through an aperture in such sheet, a tubular sheet metal sleeve longitudinally slit throughout its length adapted to fit over and have tight gripping engagement with said stud about a major portion of the latter's circumference when said stud is in untensioned condition, a radially outwardly extending flange on an end of said sleeve adapted to seat against said member and engage such sheet in the region surrounding such aperture, and a bendable radially outwardly projecting member on said sleeve having a radially inwardly directed prong spaced from said flange and adapted to engage such sheet on the other side from said flange.

5. A device for fastening a flexible rubber member to an apertured supporting sheet comprising an integral resiliently extensible stud on the sheet-contacting face of said member adapted to project through an aperture in such sheet, a tubular sheet metal sleeve longitudinally slit throughout its length adapted to fit over said stud, an inturned flange at the end of said sleeve farthest removed from such sheet adapted to grip said stud about a major portion of the latter's circumference, a radially outwardly extending flange on the other end of said sleeve adapted to seat against said member and engage such sheet in the region surrounding such aperture, and a radially outwardly projecting inwardly rebent prong on said sleeve spaced from said flange and adapted in its rebent portion to engage the edge of such aperture on the other side of such sheet from said flange, the inwardly extending end of such rebent portion of said prong being adapted to engage the side of said stud to be resiliently supported thereby.

6. In an assembly comprising an apertured supporting sheet and a member supported thereon having a stud of resiliently deformable material projecting through such aperture, fastening means comprising a tubular sheet metal sleeve fitted over such stud and having a radially outwardly extending flange at one end seated against such member, an inturned peripheral flange at the other end of said sleeve engaging and circumferentially locally deforming such stud to grip the same, said sleeve passing through such aperture about such stud, and resiliently supported laterally extending means on said sleeve engaging such sheet on the side opposite to such member to prevent withdrawal of such stud and said sleeve through such aperture.

7. In combination, a member having a resiliently deformable protuberance extending therefrom and adapted to be inserted through an aperture in a supporting member, and a fastening device mounted on said protuberance for insertion through such aperture therewith comprising a sheet metal retaining member fitted over said protuberance and interengaged therewith to prevent withdrawal of said protuberance from said retaining member, and an outwardly projecting member having a rebent prong on said sheet metal retaining member having an end resiliently supported against said protuberance adapted to engage such supporting sheet on the other side from said first member to prevent withdrawal of said retaining member through such aperture, but adapted to be forced inwardly with resultant local resilient deformation of said protuberance to permit insertion of said retaining member and protuberance through such aperture.

8. In combination, a member having a resiliently deformable protuberance extending therefrom and adapted to be inserted through an aperture in a supporting sheet, and a fastening device comprising a sheet metal retaining member tightly gripping said protuberance generally circumferentially thereof, said protuberance being longitudinally stretchable temporarily to reduce its cross-sectional dimensions to permit thus mounting said retaining member thereon, and an inwardly movable lateral projection on said retaining member bearing against said resilient protuberance and adapted to be forced in against the resiliently yielding action of the latter when said protuberance and retaining member are together inserted through such aperture and thereupon to spring out under influence of such resilient action to engage the other side of such sheet from said member.

9. An assembly comprising a member having a resiliently deformable protuberance extending therefrom inserted through a corresponding aperture in a supporting sheet, and a fastening device comprising a sheet metal retaining member secured on said protuberance, said retaining member having a laterally projecting rebent prong bearing against the surface of said sheet to the other side from said first member to prevent withdrawal of said protuberance and retaining member through such aperture, the inturned end of said prong bearing against a side of said protuberance at a point spaced from the body of said first member and being forceably inwardly movable against such resiliently yieldable side of said protuberance during insertion of the latter through such aperture in such supporting sheet and thereupon outwardly movable through resilient pressure of said protuberance.

10. A member having a resiliently deformable protuberance extending therefrom adapted to be inserted through a corresponding aperture in a supporting sheet, and a fastening device comprising a sheet metal retaining member secured on said protuberance, said retaining member having a laterally projecting flange bearing against the body of said first member and a laterally projecting rebent prong having an inturned end bearing against the resiliently yieldable side of said protuberance, the end portion of said prong being spaced from the body of said first member and adapted to engage the opposite side of such sheet to that engaged by said flange and also adapted to be forced inwardly with consequent resilient yielding action of said protuberance during insertion through such aperture.

GEORGE L. MEYERS.
JOHN C. SHUTT.

REFERENCES CITED

The following references are of record in the file of this patent:

UNITED STATES PATENTS

| Number | Name | Date |
| --- | --- | --- |
| 814,328 | Russell | Mar. 6, 1906 |
| 964,216 | Collins | July 12, 1910 |
| 2,209,403 | Kittner | July 30, 1940 |
| 2,336,933 | Hicks | Dec. 14, 1943 |
| 2,347,863 | Woodward | May 2, 1944 |
| 2,360,647 | Churchill | Oct. 17, 1944 |